United States Patent [19]
White

[11] Patent Number: 5,653,308
[45] Date of Patent: Aug. 5, 1997

[54] SAFETY NET SUPPORT ARRAY

[76] Inventor: Lawrence G. White, 8 S. Wescott Rd., Schenectady, N.Y. 12306

[21] Appl. No.: 512,211

[22] Filed: Aug. 7, 1995

[51] Int. Cl.$^6$ .................................................. E04H 17/00
[52] U.S. Cl. .................................................. 182/138; 256/31
[58] Field of Search .................................. 182/138–140; 248/166, 237; 256/24, 35, 32, DIG. 2, DIG. 6, 59, 31

[56] References Cited

U.S. PATENT DOCUMENTS

| | | | |
|---|---|---|---|
| 1,142,694 | 6/1915 | Gilbert | 248/237 |
| 2,446,093 | 9/1948 | Lambert | 248/237 |
| 2,719,696 | 10/1955 | Palka | 248/166 X |
| 3,452,956 | 7/1969 | Reed | 248/237 |
| 3,880,405 | 4/1975 | Brueske | 248/237 X |
| 4,979,725 | 12/1990 | Hutchings | 248/237 |
| 5,341,898 | 8/1994 | Bazuik | 248/237 X |
| 5,392,476 | 2/1995 | Williams | 248/166 X |

FOREIGN PATENT DOCUMENTS 2389733  1/1979  France .................................. 182/138

OTHER PUBLICATIONS

Misc. Catalog Pages: Sinco®"BeamSafe", Unnumbered; Perimeter Sys. Comp (9); Personnel and Debris Nets, Unnumbered. Client Furnished.

*Primary Examiner*—Alvin C. Chin-Shue
*Attorney, Agent, or Firm*—Fredric Morelle

[57] ABSTRACT

A perimeter safety net support assembly of multiple, fixable posts. Each post consists in a stanchion that is fixed by welding, or bolted with braces, for support to a base crosspiece. The base crosspiece is an elongate angle iron that is boltable to a surface for fixation, or constrainable by straps having hooked ends. Two struts are pivotally connected to the stanchion and joinable to each other near a pivotally joined base unit that features fixation design similar to the crosspiece.

4 Claims, 2 Drawing Sheets

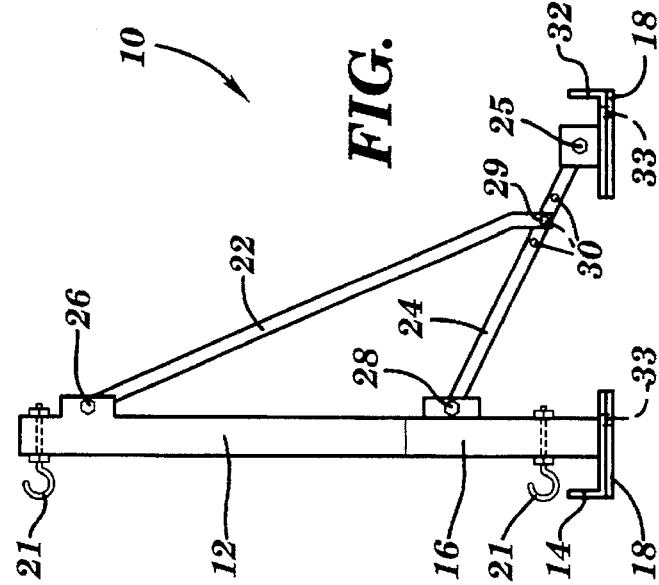
FIG. 2
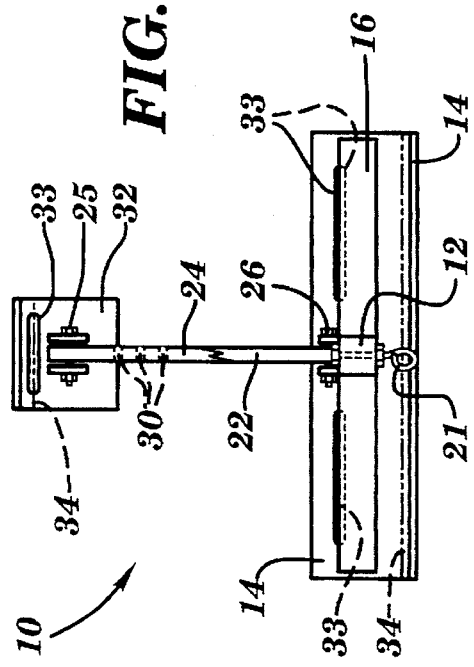
FIG. 3
FIG. 1

SAFETY NET SUPPORT ARRAY

BACKGROUND OF THE INVENTION

1. Field of the Invention

This invention relates generally to a safety net structure and, particularly, to a perimeter safety net including its supporting array, as the structure is both synthesized and erected in its preferred and alternate embodiments.

2. Relevant Art Discussion

Perimeter safety net systems are known in the art and are distinctive over their drop net analogs. The latter are generally suspended over or between trusses, cantilevered supports and the like in order to provide a safety catch or stop for dropped or falling items. The former, that with which I am concerned, is provided primarily to prevent people from falling from precipitous places such as buildings or geological ledges, superstructures and, particularly, aircraft surfaces.

Illustrative of relevant art that I have discovered or become acquainted with is a fall protection device made by SINCO (™) that provides a stanchion mounting means. The stanchion is cantilevered off a two-jaw base that engages a flange of a girder or I-beam. Safety securement of the stanchion is had by extending a strap bearing an end hook to and over an opposing flange of the girder or beam and fixedly cinching the strap to the stanchion. Finally, a safety line is drawn between at least two such stanchions and workers are tethered to the safety line. Since a primary focus of my invention is to afford perimeter safety on an aircraft surface, the aforesaid "tethered" approach is unsatisfactory because the apparatus would necessitate excessive changing of tethering positions, to provide reasonable contraint, and by so doing would restrict the worker's lateral range. Engaging the jaws on aircraft surfaces appears impossible.

Perimeter system components, as purportedly disclosed in U.S. Pat. No. 3,949,843 consist primarily in cantilevered stanchions and the webs or nets secured thereto. Webs or nets are connected by snap hooks to welded eyes, a device well know in this and several construction and marine fields. The stanchion (termed "arm") is piviotally secured to a base plate that is boltable to a horizontal surface. By virtue of the pivotal securement, as well as base plate mounting, the stanchion may be oriented to most positions with respect to the horizontal or vertical. Thus the disclosed apparatus may lend itself to rigging with perimeter or dorp nets, but according to the instructions that I have read, drop net rigging is preferred. This limitation appears to obtain simply because no provision is made to literally secure the stanchion in a fixed or totally stationary posture. Movement of the stanchion is of little consequence when a (horizontal) drop net is used, but such would prove disasterous on an aircraft surface or any time the net is vertically rigged to prevent horizontal translation such as in walking.

My requirements cannot be satisfactorily fulfilled by prior art devices, so I have developed a stanchion assembly that may be fixed by conventional bolting or strapping mechanisms but in which each stanchion can be rigidly fixed against movement or collapse. Further, the stanchions of my invention can accomodate slope mounting while still presenting a perpendicular posture relative to the walking surface or one inclined thereto.

SUMMARY OF THE INVENTION

I have overcome limitations of the prior art by utilizing an old construction concept that imputes rigidity to a framework while allowing adjustment to the (nominal) vertical posture of a stanchion. This is accomplished by integrating the stanchion into an adjustable, yet fixable, "A" type framework. The A-frame consists basically in the fixed connection of three members to form a looted triangular frame; one of the members being the looted (having a pedestal) stanchion. Unlike a rectangular frame, or the more predominate L shaped stanchions, an A-frame is incapable of movement, i.e., it is a zero-degree of freedom device. It is this feature that dictates A-frame building structures in areas of high roof or side loading. With the feet or pedestals of an A-frame structure solidly anchored, the structure can withstand enormous downward or translational (lateral) loads. Also, an A-frame necessitates none of the three connections be rigid, that is, they may be had by pin-in-hole or pivotal connection. Therefore, I have employed an A-frame to realize my stanchion support assembly for a perimeter safety net support system.

The stanchion element is an elongate post or beam joined to an orthogonal angle piece to form a T shaped member that is inverted so that the crosspiece is the stanchion base. An upper arm is hingedly or pivotally attached to the stanchion near its top, while a second arm is likewise connected to the stanchion between the upper arm and the base crosspiece. Either the upper or lower (the second) arm terminate in another base (unit) or pedestal. In my preferred embodiment, the aforesaid base is fixed to the second or lower arm. This arrangement allows the (free) upper arm to be fixed by bolt Or removable pin to a point on the second or lower arm between the stanchion and the base (unit) or pedestal, thus realizing the fixed A-frame. The crosspiece and pedestal (base unit) are adapted for bolting to a nominally planar surface by use of elongate bolt holes, or for hook and strap engagement by fabrication with hooked or reflexed flanges that are receptive of such hook and strap devices.

One unusual engagement mode is realized by placing each stanchion of at least one pair in opposition on top of a surface of limited width and thickness, such as an aircraft airfoil (wing or rudder). A strap, bearing a cinching or shanking mechanism, with a hook on each end is passed under the airfoil and used to engage the aforesaid relaxed flanges (or other hook mounts) that appear on the base crosspieces. Another hook and strap assembly of fixed length is used to engage the reflexed flanges (or similar elements) of the base units (rear bases) of the pair. When the first cinch is operated, the adjustable strap is drawn taut and the other, connecting the base units cooperates to fix and rigidify the stanchion pair relative to the airfoil surface.

A deeper understanding and further application of my invention, as well as details such safety net fixation, will become apparent in the hereinafter presented specification.

BRIEF DESCRIPTION OF THE DRAWINGS

Of the Drawings:

FIG. 1 is a front elevational illustration of the invention;

FIG. 2 is a side elevational illustration of the invention;

FIG. 3 is a top plan of the invention with upper arm cut away;

DETAILED DESCRIPTION OF THE PREFERRED EMBODIMENT

Figure 4:
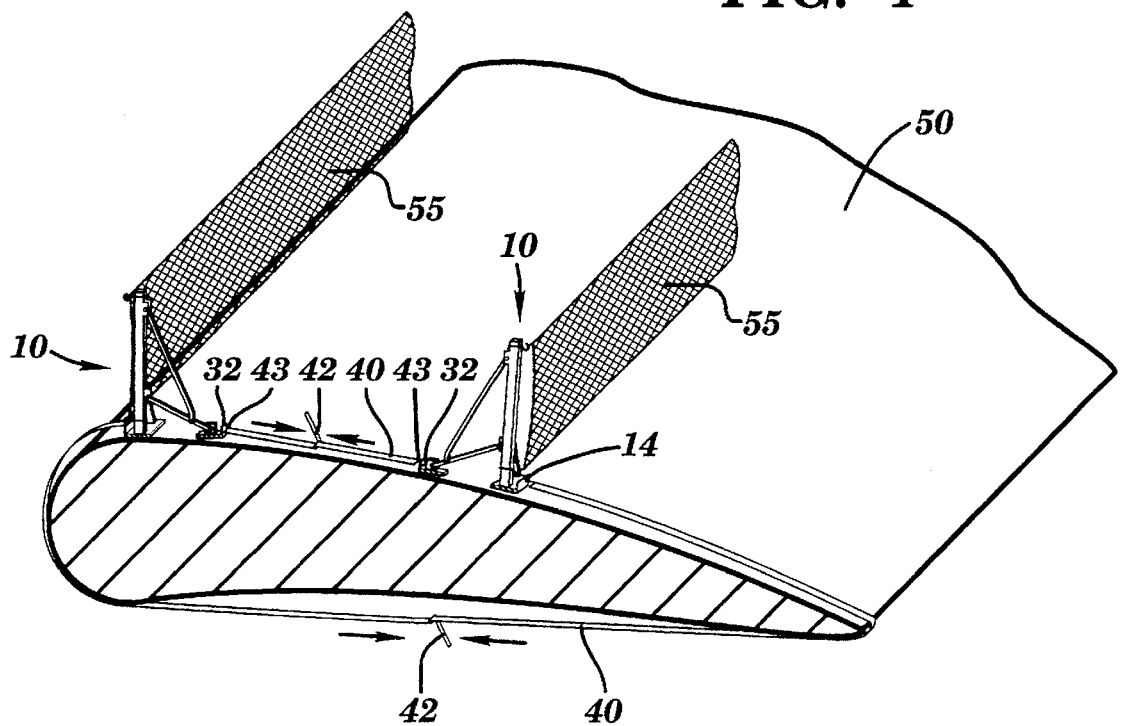
FIG. 4 is an illustration of the invention installed in an aircraft (airfoil) maintenance environment.

Construction of the invention may be had by conventional materials and fabrication methods. I employ aluminum tubing and bolting with both hardened steel and stainless steel devices. Welding is favored over bolting in cases where additional bracing, such as between crosspiece and upright (of the T-shaped stanchion) is not desired, or is to be avoided.

Referencing FIG. 1, the invention 10 is illustrated in mechanical representation as an inverted T shapes. The upright 12 serves as the "stanchion" of the system and the crosspiece 14 as the "stanchion base". Hereinafter these names and their respective reference numbers are used interchangably. The stanchion base 14 is an angle of elongate structure. It is optionally connected to the stanchion with additional brace 16 structure, generally if the various parts are to be bolted, together rather than welded. In this view, a pad 18 underlies the crosspiece (base) 14 to protect surfaces such as airframes or finished substrates. A series of holes 20 are provide for hook or similar device (not shown) engagement. In lieu of strap and hook engagement (see FIG. 4) via the holes 20, there is also provided means for bolting the invention to a substrate. Such will be discussed and illustrated at FIGS. 2 and 3. The remaining elements of importance in FIG. 1 consist of safety net tethering hooks 21. These items are well known in the art.

FIG. 2 presents the FIG. 1 embodiment in side elevation. In addition to the stanchion 12 and its base 14, upper arm 22 and lower arm 24 are seen in their respective pivotal (or hinged) mechanisms 26, 28. The lower portion of upper arm 22 is rigidly fixed, here by bolting 29, to the lower arm in one of a plurality of holes 30. The distal end of lower arm 24 is terminated at a pivotal connection 25 to pedestal 32, alternately termed the rear or secondary base unit. Like its frontal counterpart (base), the rear base or pedestal 32 is optionally fitable with surface—protecting pad 18 devices. Finally, elongate bolt holes 33 provide the earlier mentioned means for bolting or fixing the bases (4,32) to a surface. The entire mechanism of FIGS. 1 and 2 may be assembled by bolting and/or welding aluminum or steel angle irons, beams or tubing.

The plan view of FIG. 3 discloses bolt hole options in addition to a (phantom) alternate stabilization embodiment. First, stanchion base 14 discloses (in phantom) a frontal folded ledge or flange 34. Elongate bolt holes 33 are seen in view and phantom while the same type of bolt hole 33 in seen in view on the pedestal or rear base 32. FIG. 3 is the last drawing to illustrate brace 16 members, since they are optionally employed. Upper arm 22 is cut away to illustrate the bolt holes 30 on lower arm 24, by which the stylized A-frame of FIG. 2 is rigidified. In practice, these bolt holes may be placed a various distances from the rear base 32 in order to obtain the desired stanchion posture. This is especially useful when working over an airfoil surface.

It is also conceivable that one could have use for a feature such as a pivotal connection of stanchion to crosspiece or stanchion base. I have no particular use for the feature; but, it is one of many that will occur to those of ordinary skill and should not serve to defeat the purpose or spirit of my invention.

Another feature not shown in the base 32 is/are optional hook holes, on the rear base 32 vertical surface, much the same as holes 20 of stanchion base 14. These holes can accept engagement by tiedowns of conventional strapping or grappling devices. I prefer, however, in some circumstances to use a mix of engaging devices (of hook nature) and display one such arrangement in FIG. 4.

I have had, rather consistently, the need to provide perimeter safety netting over the wing surfaces of rather large aircraft. In FIG. 4, there is illustrated a perimeter safety net setup that uses the bolting and strapping options that are available with my invention. In the general method, a pair of my devices 10 is set in tandem, base-opposed configuration. Here, the rear bases are opposed, but circumstances could require, and the invention will accomodate, front-front or front-rear base oppositions. For the sake of clarity, braces 16 and part of crosspiece bases 14 are not shown. In this instance, the rear bases 32, which could be bolted to hard points on the wing 50 surface are joined by a tie-down (cargo) stap 40 which can be tightened or cinched by cinch/shank 42, in the direction on the opposing arrows. The straps are provided hooks which engage reflexed flanges 34 or holes 20 of the bases. Similary, another tie-down strap 40 is joined to one of the unattached bases (crosspiece or rear) of each stanchion device 10 by passing it from one, under the airfoil and around it to join with the other base, here a crosspiece or stanchion base 14. As above, the cinch/shank 42 mechanism is used to draw the straps in the indicated (arrows) direction. Either bolt-down or strapping stabilization is suitable for fixing the invention 10 array in position for securing thereon a safety net fabric 55.

Figure 5:
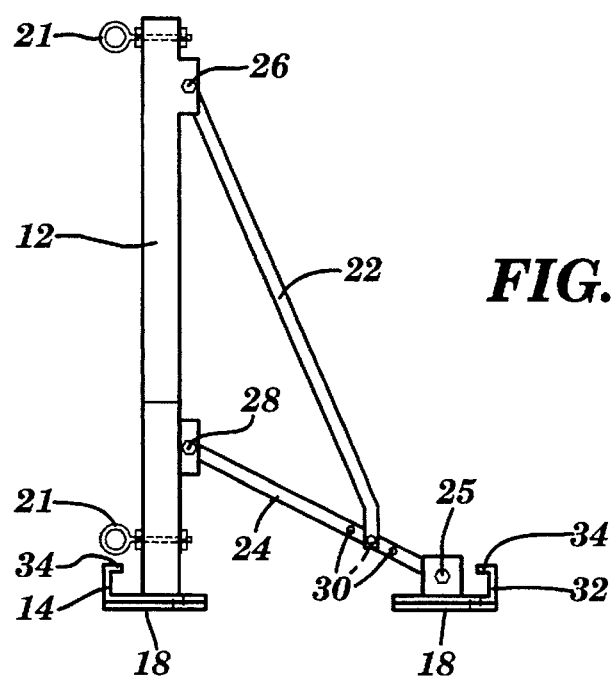
FIG. 5 is a partial side elevation of an alternate embodiment with view of phantom elements of FIG 3.

The alternate fixing embodiment discussed above uses the reflexed flanges 34 of the bases 14, 32 as shown in FIG. 5. All other parts of the invention, having been now discussed, as well as the two preferred fixing methods (bolt-down and/or strapping), this flange detail concludes the detailed description.

The reader, and particularly those skilled in the art, will find the invention to be inexpensive, reliable and readily suited to its task of providing perimeter or drop net support. Many applications and modifications will become apparent with its continued usage in the field. Such are commended to those so interested limited only by the hereinafter appended claims.

What is claimed is:

1. A perimeter safety net support array of at least two safety net supports that are fixable to an essentially horizontal airframe surface and in proximity of each other to accommodate a safety net on and between each support, each support being a triangular structure comprising: an inverted T-shaped member formed of an upright which is connected to a planar-bottomed base crosspiece footing and including bracing means disposed between the upright and crosspiece footing and also including attachment members proximate the top and bottom of the T-shaped member for connecting a safety net thereto, the crosspiece footing having a hook-shaped flange extending upwardly from and along a forward edge of said base for alternate fixing on the airframe surface; a pivotally disposed first strut depending from a first pivotal connection on a back of the upright proximate said base extending to and pivotally connected to a planar-bottomed pedestal unit, said pedestal unit having a hook-shaped flange extending upwardly from and along a rear edge of said pedestal unit for alternate fixing on the airframe surface, said first strut having a plurality of attachment holes between its pivotal connections; a pivotally disposed second strut depending from said back of the upright, between the top thereof and the first strut, extending to and selectively pivotally attached to one of said plurality of attachment holes on said first strut, whereby connection of the upright, said first strut and said second strut with concomitant fixing of the footing and the pedestal unit to said airframe surface, effects a structure that withstands the force of a human body moving horizontally against it.

2. The array of claim 1 wherein said base comprising at least one elongated hole therein for the reception of a bolt therethrough.

3. The array of claim 1 wherein said bracing means comprises a symmetrical brace structure.

4. The array of claim 4 wherein said pedestal unit comprising at least one elongate hole in the bottom thereof, said at least one elongate hole receptive therethrough of a bolt.

* * * * *